(12) United States Patent
Rudduck et al.

(10) Patent No.: US 7,168,213 B2
(45) Date of Patent: Jan. 30, 2007

(54) ADJUSTMENT DEVICE AND BUILDING ELEMENT

(75) Inventors: Dickory Rudduck, Seaforth (AU); Michael John Laybourne Hort, Chatswood (AU)

(73) Assignee: Telezygology Inc., Milsons Point (AU)

( * ) Notice: Subject to any disclaimer, the term of this patent is extended or adjusted under 35 U.S.C. 154(b) by 0 days.

(21) Appl. No.: 10/727,987

(22) Filed: Dec. 5, 2003

(65) Prior Publication Data

US 2004/0168382 A1    Sep. 2, 2004

Related U.S. Application Data

(63) Continuation of application No. PCT/AU02/00747, filed on Jun. 7, 2002.

(30) Foreign Application Priority Data

Jun. 7, 2001  (AU) .................................. PR 5540
Jun. 7, 2001  (AU) .................................. PR 5541

(51) Int. Cl.
*E04H 1/00* (2006.01)
*E04B 2/90* (2006.01)

(52) U.S. Cl. ...................... 52/235; 52/243.1; 52/481.2; 52/511; 52/772; 52/730.3

(58) Field of Classification Search .................. 52/235, 52/236.3, 481.2, 476, 479, 772, 730.3, 586.1, 52/656.1, 511, 126.3, 243.1
See application file for complete search history.

(56) References Cited

U.S. PATENT DOCUMENTS 2,103,202 A  12/1937  Green 3,053,353 A  *  9/1962  Miller .......................... 52/235
3,134,404 A     5/1964  Ziccardi (Continued)

FOREIGN PATENT DOCUMENTS

AU    1198/66 B    8/1967

(Continued)

OTHER PUBLICATIONS

"Heat Sinks", Alcan Extrusion Catalogue Jan. 1992, p. 26.

*Primary Examiner*—Winnie Yip
(74) *Attorney, Agent, or Firm*—Wilmer Cutler Pickering Hale and Dorr LLP

(57) ABSTRACT

There is provided an adjustment device for adjusting the vertical height of, for example, studs, furniture and large appliances. The device has a base (12), a pine (14) upstanding from and supported by the base and a rotatable cam element (20). The pin has a number of grooves (16) and the cam is capable of engaging one or more of the grooves to alter the distance between the base and cam. Also disclosed is a stud or mullion (30) having two sets of channels, each of which is adapted to receive a cooperating means for mounting a panel or bracket. The sets of channels are parallel to each other and spaced apart by parallel spaced webs (32, 34). The adjustment device may be inserted in the stud or mullion. Further disclosed is a joining clip (not illustrated) for mounting a panel or bracket to the stud or mullion. The clip is in two parts, one part has means to connect the clip to the panel and the other has a pair of resilient arms and is able to mate with the first part.

13 Claims, 12 Drawing Sheets

U.S. PATENT DOCUMENTS

| | | | |
|---|---|---|---|
| 3,596,958 A | 8/1971 | Bowerman | |
| 3,686,810 A | 8/1972 | Allen | |
| 3,745,736 A | 7/1973 | Fischer et al. | |
| 3,760,547 A | 9/1973 | Brenneman | |
| 3,844,086 A | 10/1974 | Radtke | |
| 3,866,364 A * | 2/1975 | Pollard | 52/733.4 |
| 3,866,374 A * | 2/1975 | Dallen | 52/204.597 |
| 4,388,786 A * | 6/1983 | Gassler | 52/282.2 |
| 4,614,067 A * | 9/1986 | Matsubara | 52/235 |
| 4,667,916 A | 5/1987 | Richards | |
| 4,802,296 A | 2/1989 | Kovalak | |
| 4,841,688 A * | 6/1989 | Rinaldi | 52/63 |
| 5,042,555 A | 8/1991 | Owens | |
| 5,076,623 A | 12/1991 | Richards | |
| 5,170,801 A | 12/1992 | Casper et al. | |
| 5,439,310 A | 8/1995 | Evenson et al. | |
| 5,452,557 A | 9/1995 | Posenaer | |
| 5,466,083 A | 11/1995 | Hogg | |
| 5,481,839 A * | 1/1996 | Lang et al. | 52/235 |
| 5,490,648 A | 2/1996 | Cullen | |
| 5,546,718 A | 8/1996 | Way | |
| 5,634,300 A * | 6/1997 | Huebner et al. | 52/36.1 |
| 5,638,653 A | 6/1997 | Rossi | |
| 5,644,878 A | 7/1997 | Wehrmann | |
| 5,996,299 A | 12/1999 | Hsueh | |
| 6,003,279 A * | 12/1999 | Schneider | 52/481.1 |
| 6,023,896 A * | 2/2000 | Rothschild | 52/243.1 |
| 6,247,282 B1 | 6/2001 | Searle | |
| D465,035 S | 10/2002 | McFarland | |

FOREIGN PATENT DOCUMENTS

| | | | |
|---|---|---|---|
| AU | 55877/69 | | 12/1970 |
| AU | 86748/75 A | | 5/1977 |
| AU | 21057/77 | | 2/1979 |
| AU | 84217/82 | | 2/1982 |
| AU | 77023/81 | | 5/1983 |
| AU | 62622/90 A | | 3/1991 |
| CH | 374471 | | 1/1964 |
| DE | 323 158 | | 7/1920 |
| DE | 323158 A | | 7/1920 |
| DE | 33 42 169 | | 5/1985 |
| DE | 3613574 | | 12/1987 |
| DE | 296 18 340 | | 2/1997 |
| EP | 0 165 190 | | 12/1985 |
| EP | 393473 B1 | | 9/1993 |
| EP | 671519 | * | 3/1994 |
| EP | 0 609 951 | | 8/1994 |
| EP | 0 730 069 | | 9/1996 |
| EP | 0 600 545 B1 | | 5/1999 |
| EP | 1022403 | * | 7/2000 |
| FR | 2240327 A | | 3/1975 |
| FR | 2449174 | | 9/1980 |
| FR | 2 484 501 | | 12/1981 |
| FR | 2679939 | * | 7/1991 |
| FR | 2753733 | * | 9/1996 |
| GB | 843571 A | | 8/1960 |
| GB | 1504989 A | | 3/1978 |
| GB | 2107754 | | 5/1983 |
| GB | 2 131 869 | | 6/1984 |
| GB | 2322646 A | | 9/1998 |
| JP | 52107114 | | 8/1977 |
| WO | WO 81/03043 | | 10/1981 |
| WO | WO 95/27834 | | 10/1985 |
| WO | WO 91/08358 | | 6/1991 |
| WO | WO 98/16699 | | 4/1998 |
| WO | WO 00/29688 | | 5/2000 |
| WO | WO 00/37846 | | 6/2000 |
| WO | WO 01/16013 | | 3/2001 |

* cited by examiner

Figure 12
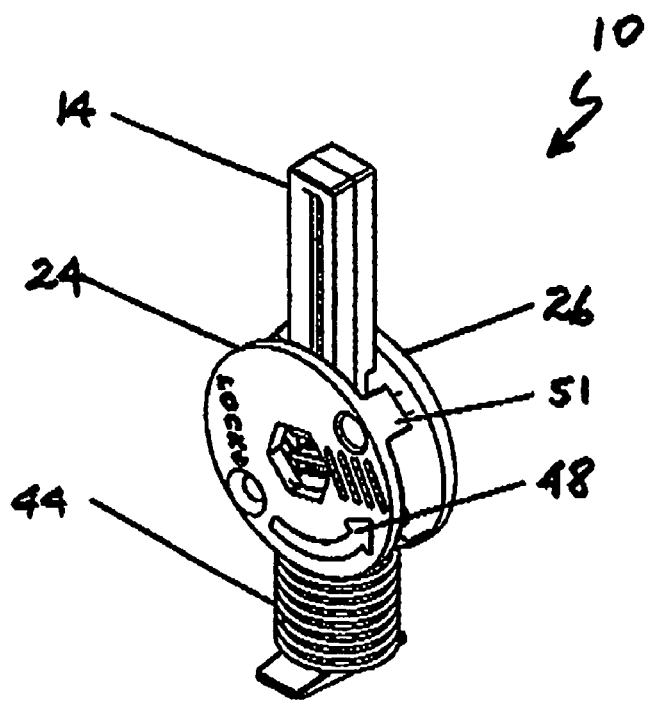
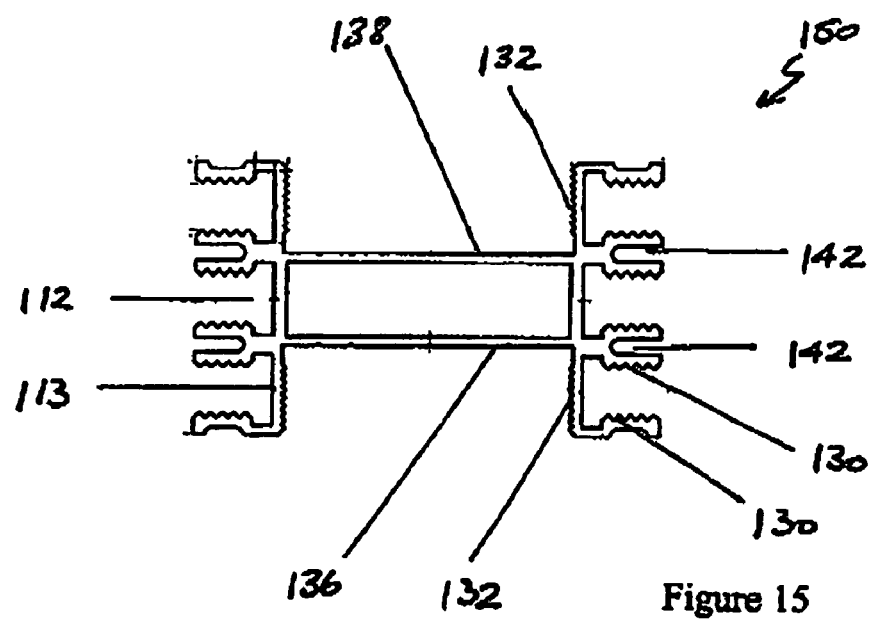
Figure 15

ADJUSTMENT DEVICE AND BUILDING ELEMENT

RELATED APPLICATIONS

This application is a continuation of International Application No. PCT/AU02/00747, filed Jun. 7, 2002, which was published under PCT Article 21(2) in English and is incorporated herein by reference. International Application No. PCT/AU02/00747 claims priority from Australian Patent Application Nos. PR 5540 filed Jun. 7, 2001 and PR 5541 filed Jun. 7, 2001, both of which are incorporated herein by reference.

TECHNICAL FIELD

This invention relates to an adjustment device which is particularly useful in adjusting the vertical height of studs and the like in construction. While, for convenience, the invention will frequently be described below in this connection, it is to be understood that the invention is not limited in this way. The invention has broader application and can be used, for example, in connection with furniture assembly and as a leveling device for restaurant tables, refrigerators, washing machines, etc. Other applications are possible.

This invention also relates to improved building elements useful in connection with the construction industry. The invention is applicable to the building of both internal walls and partitions and external walls, especially cladding. However, it is to be understood that the invention is not necessarily limited to these applications.

BACKGROUND ART

In relation to the first aspect, in the construction industry, as well as in many other applications, it is desirable to provide adjustment up to a maximum of about 6–7 mm. It is an aim of the present invention to provide a device which permits that quantum of adjustment, and which may also be useful, at least in some embodiments, to effect far more extreme adjustments, for example, of 50 mm or more.

It is also desirable to provide an adjustment device which can provide tension as well as or as an alternative to compression. In other words, it is desirable that the device be able to "pull" as well as "push". It is an aim of the present invention to provide such a device, at least in some embodiments.

In a second aspect, the invention represents an advance on the invention disclosed in international patent application No. PCT/AU97/00681 ("the PCT Application"), the contents of which are imported herein by reference.

The PCT Application disclosed a building element being a stud. The stud had a first set of channels and a second set of channels. Each channel in each set was adapted to receive a co-operating means for the purpose of mounting a panel or bracket on the stud. The first set of channels was parallel to and spaced from the second set of channels.

While the number of channels was not limited as to number, there were preferably three in each set. It was also preferred that the first set of channels was spaced from the second set of channels by a single web and this was illustrated in FIGS. 1 to 3, 6, 8, 10 and 12 to 20 of the drawings.

The PCT Application also disclosed a building element being a joining clip. The joining clip was adapted to mount a panel or bracket to the stud also disclosed in the PCT Application. The joining clip included the co-operating means (to be received in each channel of each set of the stud). The joining clip also included means for connecting the joining clip to the panel or bracket. The co-operating means included a pair of resilient arms.

DISCLOSURE OF THE INVENTION

In the first aspect, this invention provides an adjustment device which includes:
  a base;
  a pin upstanding from the base and being supported by the base, the pin having a plurality of grooves; and
  a rotatable cam element having a projection capable of engaging one or more of the grooves to alter the distance between the base and the cam element;

Because the cam element can be rotated to a position where the projection does not engage the grooves, the cam element can be set to different positions to effect coarse adjustment, and then rotated to engage the grooves and effect fine adjustment. The device of the invention is thus capable of being reset into different positions and so can accommodate a wide range of height adjustments.

The cam element is designed so that a stud or other element with the adjustment device attached can be raised or lowered without the requirement to cause the full length of the pin to be engaged by the projection on the cam element.

The pin in the adjustment device of the invention may be of any desired length. Although it is anticipated that the adjustment device of the invention may often be used to effect an adjustment of around 6–7 millimeters in the case of use in building construction, it is entirely feasible to use the adjustment device of the invention for far greater adjustment.

The grooves on the pin are preferably inclined. These may forms a screw thread or a series of inclined, parallel grooves on opposing sides of the pin.

Preferably, the cam element is designed so that rotation can be effected by an allan key or similar tool.

When the adjustment device of the invention includes biasing means, and especially when the device is inserted in a web of a stud, it is preferred that the adjustment device is supplied on site in a prestressed stage. This may be achieved by engaging the cam element with one of the grooves, against the bias provided by the spring. On site, when it is desired to adjust the stud (to make up a minor or major discrepancy in height), the cam can be rotated to engage a groove above or below that of the original engagement, as desired, in order to elevate or lower the stud. Preferably, the device includes a stop which can lock the cam in a desired position. The cam may be rotatable through a narrow arc for this purpose—for example, less than 80°.

In this embodiment, if it is decided on site that a greater height adjustment is required, the device is designed so that rotation through more than, say, 80°, will release engagement of the projection on the cam with the pin. The spring bias will then urge the cam away from the base to take up available height and the cam may then be rotated to engage another groove, to be subsequently locked in the new position.

Preferably, the adjustment device includes means, such as a spring, for biasing the cam element in relation to the base. Preferably, the bias is away from the base. The adjustment device also may include means for locking the cam element in place once the desired distance between the base and the cam element has been achieved. The adjustment device may be designed to urge the cam element away from the base if the cam element is unlocked, through the influence of the biasing means. Depending on the length of the pin and the chosen location of the grooves, the adjustment device may be capable of adjustment to any desired extent.

The adjustment device of the invention is particularly suitable for insertion in a stud or other building element, so that the vertical alignment of the stud can be adjusted by means of the adjusting device. In this situation, the cam element is preferably inserted in a web of the stud, with the base supporting the stud on the floor of the building structure. Rotation of the cam element can enable the height of the stud to be adjusted upwardly or downwardly as desired. The adjustment device of the invention is preferably suitable for insertion in the building element of the second aspect of the invention.

In relation to the second aspect of the invention, it has now been found that the stud of the PCT Application can be produced in an improved form if the first set of channels is spaced from the second set of channels by first and second webs, being spaced from each other.

It has also been found that a modification of the stud can be produced to form a mullion which is particularly useful for external walls, especially in connection with glazed or cladding panels.

Accordingly, in a second aspect the present invention provides a building element suitable for use as a stud or mullion, the building element having a first set of two or more channels and a second set of channels, each channel in each set being adapted to receive a co-operating means for the purpose of mounting a panel or bracket on the building element, the first set of channels being parallel to and spaced from the second set of channels, each channel in the first set of channels having a base between a pair of sides, the bases of the channels in the first set of channels being aligned, characterised in that the first set of channels is spaced from the second set of channels by first and second webs, the first web being parallel to and spaced from the second web.

The co-operating means may include a pair of resilient arms as disclosed in the PCT Application. Alternately or in addition the co-operating means may include a fastener capable of operating by remote activation as disclosed in International Patent Application No. PCT/AU99/00185, the contents of which are imported herein by reference.

In relation to the building element of the second aspect of the invention, each channel in each set has a base and in some applications it is useful to be able to screw through or otherwise penetrate the base. The use of two webs, spaced one from the other, can enable screws or other penetrating articles to be inserted through the base of a channel between the first and second webs, without affecting the strength of either web. This can be contrasted with the situation shown in FIG. 1 of the PCT Application, for example. If it was desired to screw through the centre of base 13 of central channel 12 in FIG. 1 of the PCT Application, the screw would penetrate web 11, affecting its integrity and possibly weakening the stud. That problem can be avoided by use of the building element of the present invention.

When the building element of the present invention is to be used as a stud, it is preferred that the first and second webs are located close to a centre line for the building element, the centre line extending from the centre of the first set of channels through the centre of the second set of channels. However, the building element of the invention may also be used as a mullion, in which case it is preferred that the first and second webs are located as far from the centre line as possible.

The stud or mullion of the present invention may be made of any suitable material but is preferably steel or aluminium. If desired, the stud or mullion of the present invention may be grooved, either to reduce mass or to enhance reception and retention of the co-operating means, or both. Preferred embodiments of these aspects are shown in connection with the attached drawings.

The use of first and second webs can also serve to strengthen the stud or mullion and enable lighter or thinner material to be used in its construction while reducing the likelihood of twisting.

When the building element of the present invention is to be used as a mullion, it may be convenient if the form of one set of channels is different from the form of the other set of channels. Use of the mullion of the invention can provide a system of providing external cladding or facades to buildings with hidden framing. The framing can accept glass or cladding panels and can enable simplified fitting of such panels. The mullion can also provide draining for the facade. One set of channels can accommodate the glass or cladding panels, while the other can accommodate internal linings for the building structure.

Especially when the building element of the invention is to be used as a mullion, it may have a first arm and a second arm, the first arm being at an angle to the second, each arm having two or more channels set side by side.

In addition to the first and second arms, the building element in this aspect of the invention may have third, or third and fourth, arms or even more. The angle between the first and second arms is preferably 90° but other angles are not excluded. When there are two arms, the element is preferably of an "L-shape". When there are three arms, the element preferably forms a "T-shape". The four-armed form of the element is preferably a cruciform shape.

The arms may lie in a single plane or may lie in two or three planes.

Preferably, there are three channels in each arm. The junction between the respective channels where the arms "meet" can take any desired confirmation, especially having regard to the desirability to enable the building element in this aspect of the invention to provide drainage.

If desired, the building element of this aspect of the invention may be formed so that it has a mirror image, joined by the two webs, each arm resembling the stud of the second aspect of the invention.

As mentioned above, grooves may be formed in the stud or mullion of the invention. Conveniently, at least some of these grooves may be made in channel walls. Complementary grooves may be formed on the resilient arms on the joining clip and may assist in locking the joining clip into a chosen channel, at least until it is desired to disengage the joining clip from the channel.

As will be apparent to one skilled in the art, it may be possible, using the joining clip and stud or' mullion of the invention, to forward fix a panel to a stud or mullion. It is also to be appreciated that the stud or mullion of the present invention may be used with the joining clip of the PCT Application, and that the joining clip of the present application may be used with the stud of the PCT Application, in each case with appropriate adjustments if necessary.

It is contemplated that the stud or mullion of the invention may include means allowing it to be adjusted vertically in situ.

The invention also provides the adjustment device of the invention combined with the building element of the invention, being the stud or mullion. The adjustment device of the invention is preferably inserted into the building element of the second aspect of the invention.

It has now been found possible to devise a way of making the clip disclosed in the PCT Application in more than one part. This is particularly useful because one part of the joining clip can be attached to the panel or bracket in the factory and the other part of the clip, which includes the co-operating means, can be transported separately from the panels and attached thereto on site. This can avoid any problem arising from damage to the co-operating means during transport.

Another useful feature of the new clip, in some embodiments, is the dimensional tolerance it allows in respect of alignment of the panel or bracket with the stud or mullion.

Accordingly, this invention provides, in a third aspect, a building element being a joining clip adapted to mount a panel or bracket to the stud or mullion referred to above, the joining clip including the co-operating means and also including means for connecting the joining clip to the panel or bracket, the co-operating means including a pair of resilient arms, characterised in that the joining clip has two separate parts: a first longitudinally extending part which includes the means for connecting the joining clip to the panel or bracket and a second longitudinally extending part which includes the pair of resilient arms, the first part being adapted to mate with the second part.

Preferably, the first part permits simple attachment to the panel or bracket, for example, by adhesion, nailing or screwing. The first part may mate with the second part in any suitable way. Preferably, the first part has a protrusion adapted to snap into or slide into a channel on the second part. Of course, this arrangement may be reversed so that the second part has a protrusion adapted to snap into or slide into a channel on the fast part. Other arrangements may be possible.

The first part may be regarded as a clip carrier, while the second part may be regarded as the clip. These terms will be used in relation to a preferred embodiment described in the attached drawings. It is also preferred that both the first and second parts are made of relatively resilient material, to assist in mating one with the other and also to provide flexibility for variation in site dimensions. The material of the joining clip may also be able to cope with expansion and is contraction in situ.

The joining clip may be suitably designed so that it can also function as an internal drain in the panel assembly. It may, instead or in addition, form a seal for the panel assembly.

Instead of being constructed from relatively flexible material, such as plastic polymers, one or both parts of the joining clip may be made from more rigid material, especially for external use. For example, stainless steel may be used.

As indicated above, it is contemplated that the clip carrier may be attached to the panel in the factory. It is contemplated that the clip may be installed on site and the clip carrier attached to the clip on site. It is preferred that the mating between the is first and second parts takes place by pushing the parts together and by pushing the second part into an appropriate channel in the stud or mullion. However, if desired, the fast and second parts may be mated by sliding one or part of one into the other.

BRIEF DESCRIPTION OF THE DRAWINGS

The invention in its various aspects will now be described in connection with certain embodiments thereof described in connection with the accompanying drawings. It is to be understood that these embodiments are not intended to be limiting on the scope of the invention.

In the drawings:

FIG. 12 is a perspective view of the device of FIGS. 10 and 11;

FIG. 15 is a cross-sectional view of a second embodiment of the stud of the invention;

BEST MODES OF CARRYING OUT THE INVENTION

Figure 1:
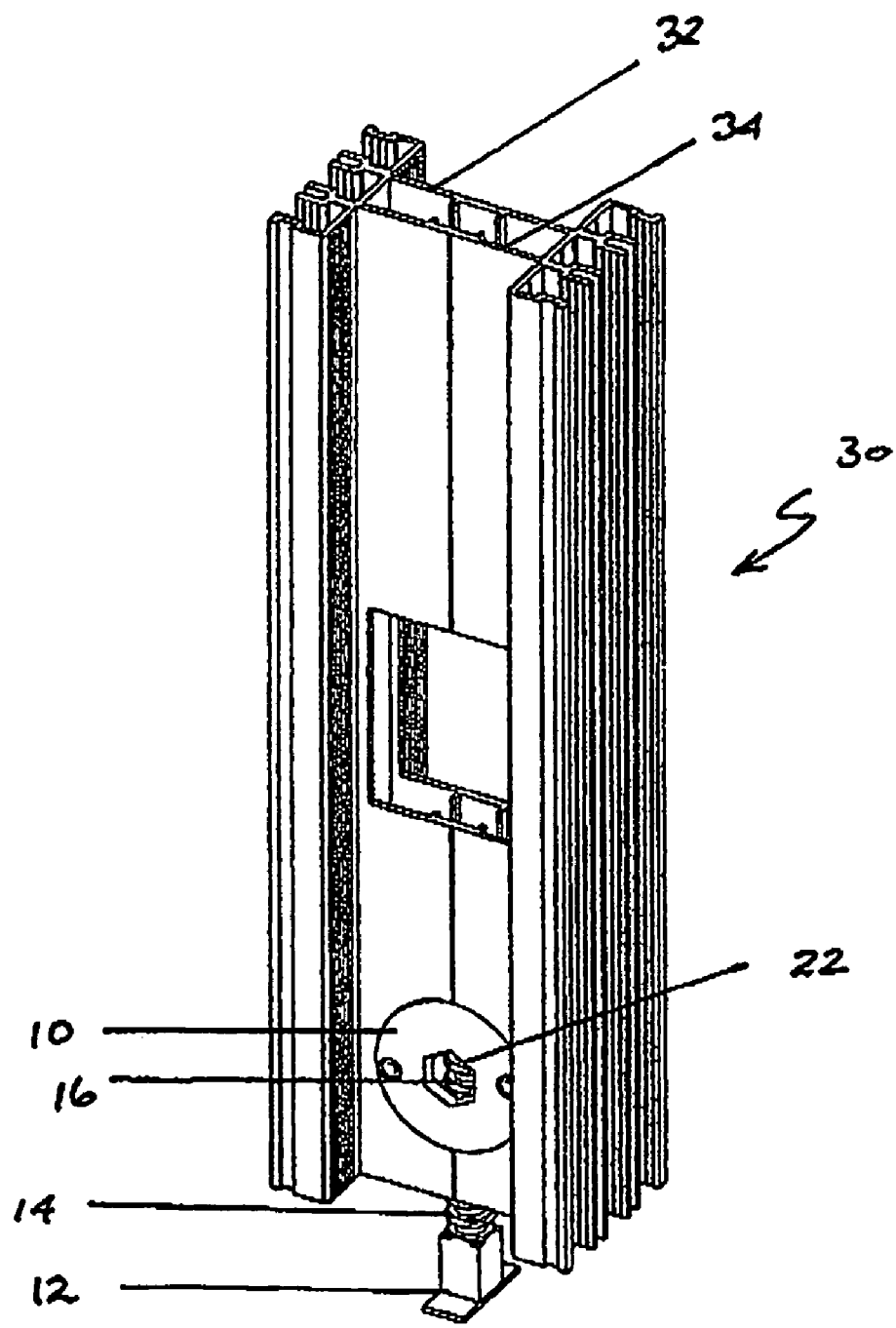
FIG. 1 is a perspective view of a first embodiment of the adjustment device of the invention, inserted in an embodiment of a building element of the invention, being a stud.
Figure 2:
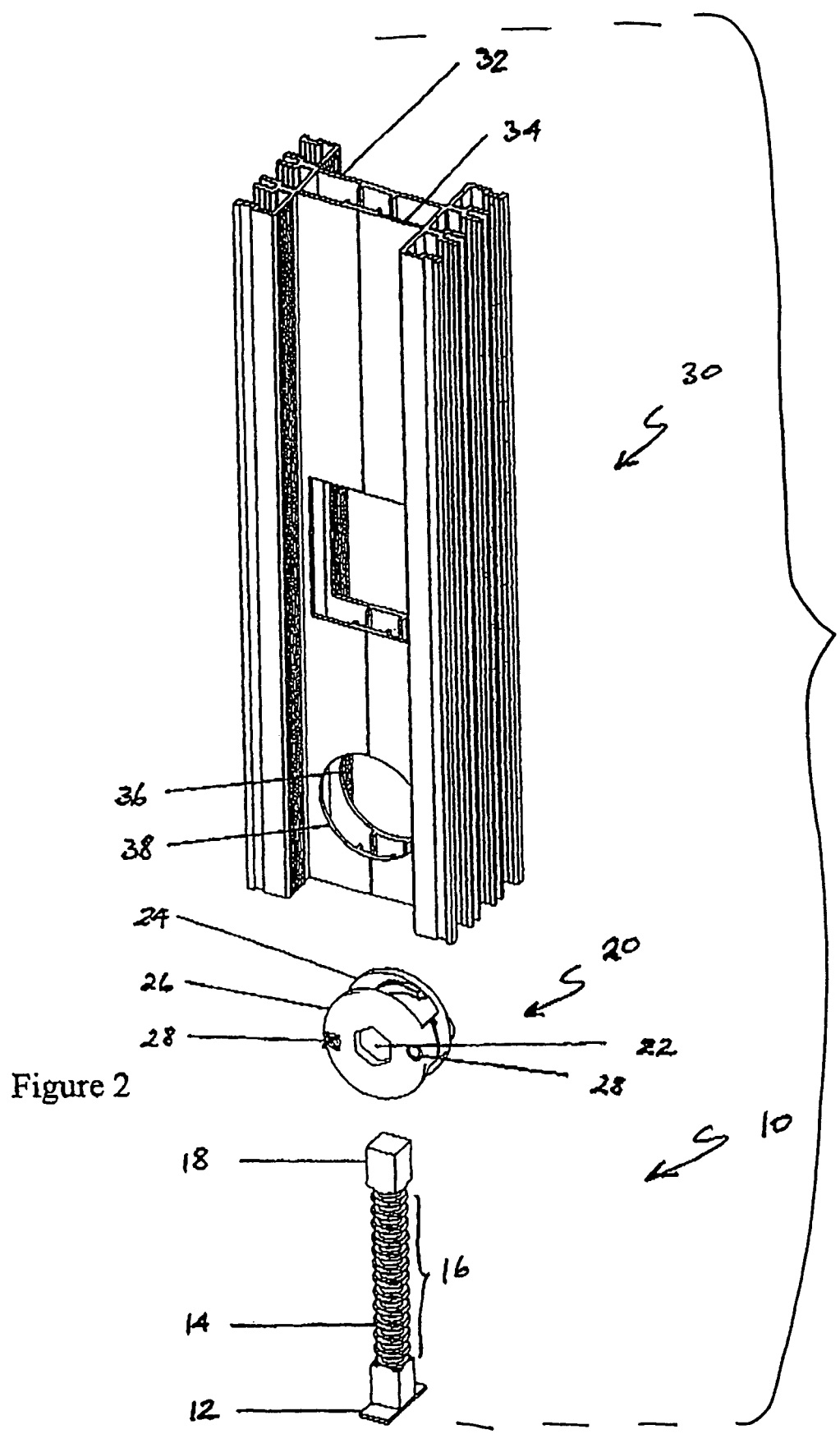
FIG. 2 is an exploded view of the adjustment device and stud of FIG. 1, showing components.

Referring first to FIGS. 1 and 2, adjustment device 10 is shown with base 12 supporting pin 14 which is upstanding from base 12. Pin 14 has plurality of grooves 16, which in this case spiral around pin 14 in the form of a screw. Pin 14 also has end stop 18 (refer FIG. 2) at the top of pin 14.

Rotatable cam element 20 is adapted to be mounted on pin 14 and has internal protrusions (not shown) which are capable of engaging grooves 16 when cam element 20 is rotated. Rotation of cam element 20 in one direction will cause it to climb up pin 14, while rotation in the reverse direction will cause cam element 20 to descend pin 14.

Cam element 20 has hexagonal opening 22 for insertion of an allan key (not shown) or similar tool to facilitate rotation of cam element 20.

Cam element 20 is made in two parts, 24 and 26. If it is desired to lock cam element 20 on pin 14, this can be achieved via screws 28.

Stud 30 has dual webs 32 and 34. Adjustment device 10 is designed to fit into apertures 36 and 38 formed in webs 32 and 34 respectively and to be rotatable therein.

As will be readily appreciated by one skilled in the art, rotation of cam element 20 on pin 14 will raise or lower stud 30 in relation to base 12, thus adjusting the height of stud 30 in situ as desired.

Figure 3:
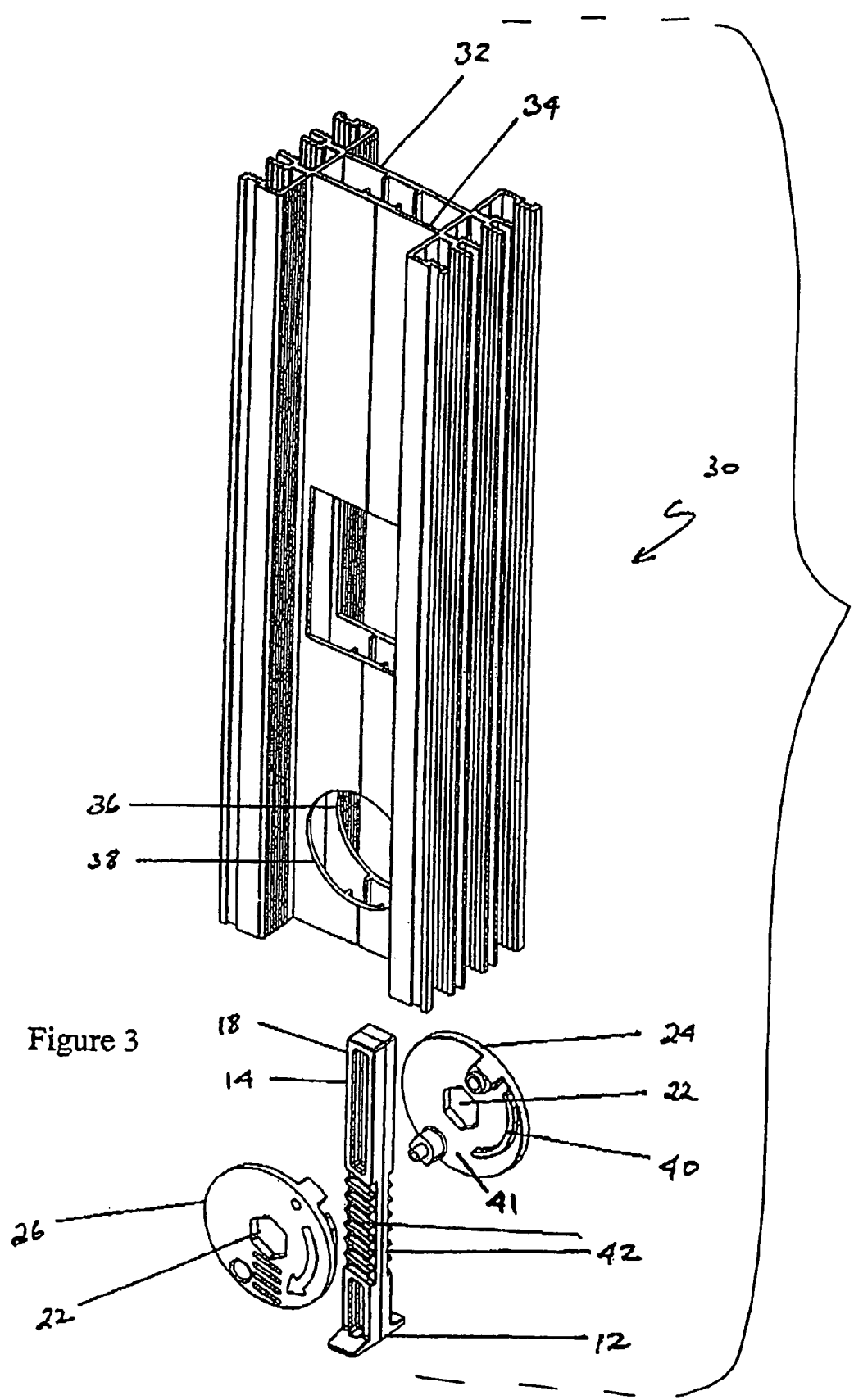
FIG. 3 is an exploded, perspective view of a second embodiment of the adjustment device of the invention, the stud being the same as in FIGS. 1 and 2.

In the case of the second embodiment in FIG. 3, like parts are labelled with like numbers. In the second embodiment, however, pin 14, instead of having spiral screw grooves 16, is flat sided and has inclined grooves 42 on either side.

In this Figure, internal protrusion 40 on cam element 24 is shown. It is this protrusion which engages with inclined grooves 42 when cam element 20 is rotated.

Reference is now made to FIGS. 4 to 12. Like parts are numbered the same as in FIGS. 1 to 3. Adjustment device 10 differs to that in FIG. 3 in that it includes spring 44. Spring 44 is attached, at its upper end, to stud 30 by clip 46. The lower end of spring 44 rests on base 12. Spring 44 biases cam element 20 (and hence stud 30) away from base 12.

Figures 4, 5:
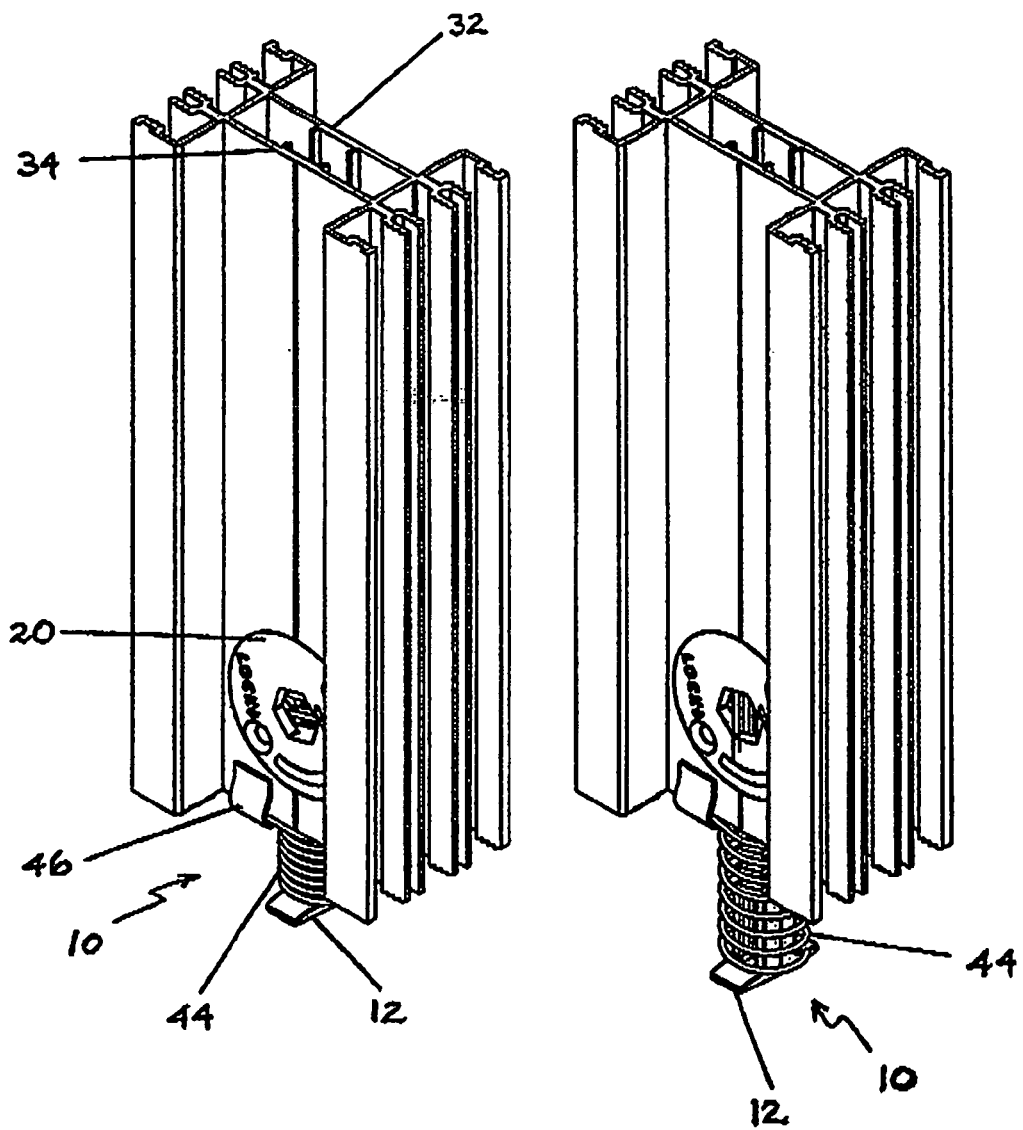
FIG. 4 is a perspective view of a third embodiment of the adjustment device of the invention, inserted in a similar stud to that in the previous Figures and showing the device in the prestressed state.
FIG. 5 is a perspective view of the embodiment of FIG. 4, with the stud in an elevated position and the device unstressed.
Figures 6, 7:
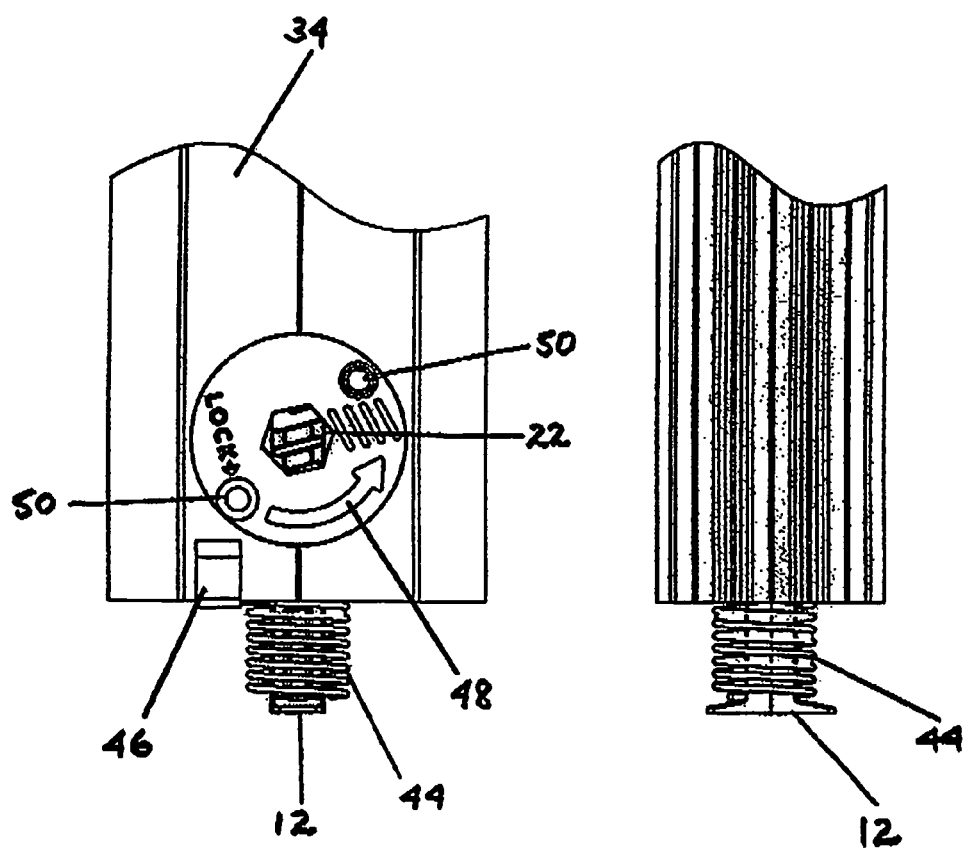
FIG. 6 shows in front elevation the adjustment device and lower part of the stud of FIG. 4.
FIG. 7 is a side elevation of the stud and device of FIG. 6.
Figures 8, 9:
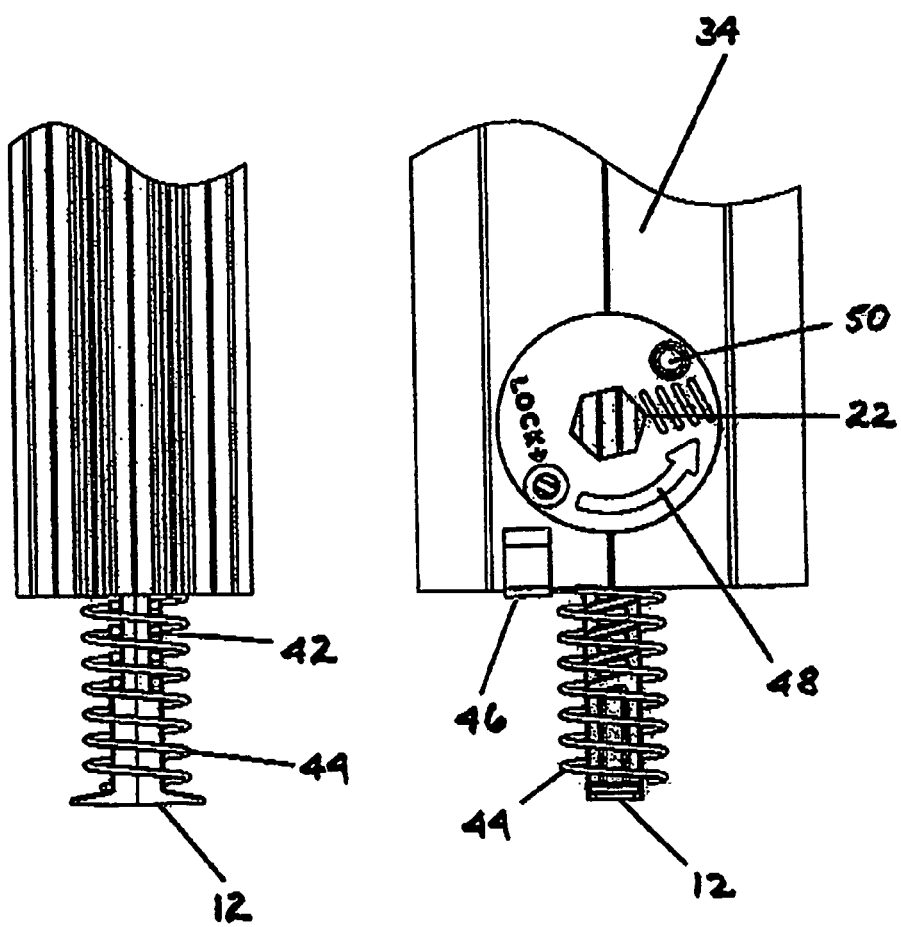
FIG. 8 is a front elevation of the adjustment device and lower part of the stud of FIG. 6, with the stud in an elevated position and the device unstressed.
FIG. 9 is a side elevation of the stud and device of FIG. 8.
Figures 10, 11:
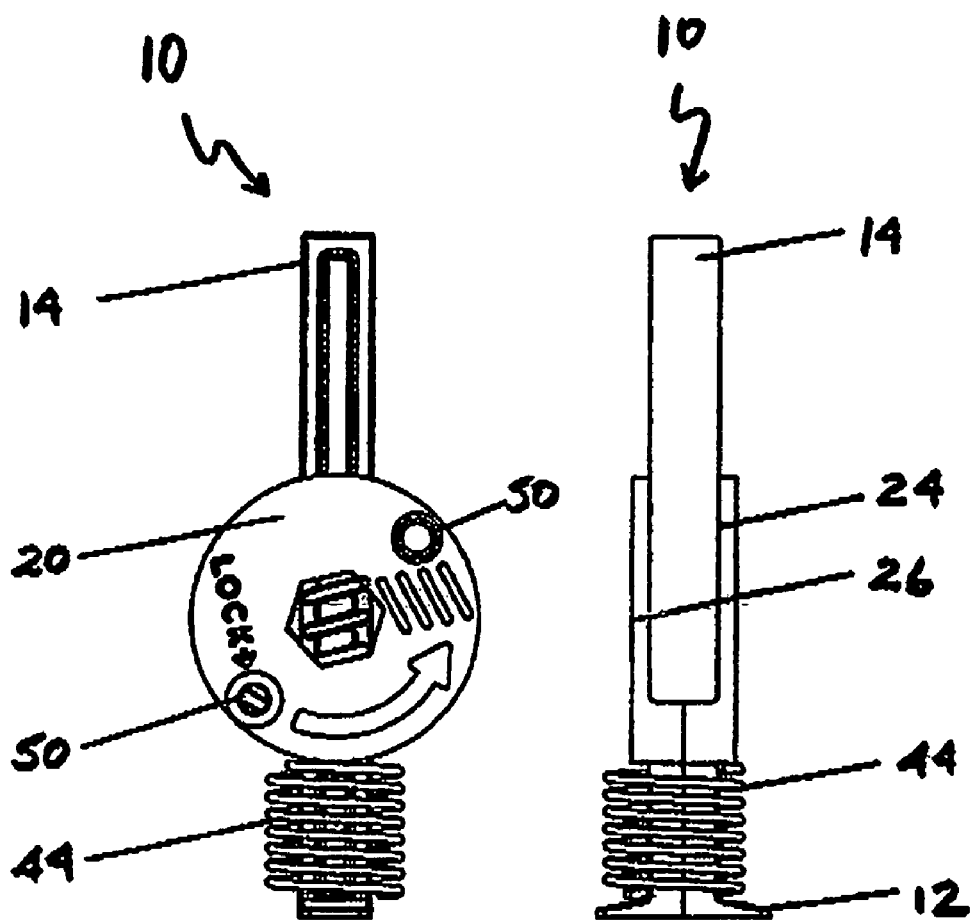
FIG. 10 shows the adjustment device of FIG. 6 without the stud.
FIG. 11 is a side elevation of the adjustment device shown in FIG. 10.

In the configuration shown in FIG. 4, spring 44 has been compressed and is held in that position by engagement of one of grooves 42 by protrusion 40 (not visible in these Figures, but refer FIG. 3). When an allen key or other suitable tool (not shown) is inserted in hexagonal opening 22, and rotated, protrusion 40 engages a groove 42, causing cam element 20 and hence stud 30 to change in distance from base 12. If cam element 20 is rotated in the direction shown by arrow 48, the distance increases. Reverse rotation decreases the distance.

In this embodiment, an internal stop 51 (refer FIG. 12) (indicated externally by rivet 50) limits rotation in the direction of arrow 48 beyond about 80°. If at this stage further adjustment is required, rotation of cam element 20 in the direction opposite to that of arrow 48 will enable protrusion 40 to clear all grooves 42 and pin 14 is released from engagement with cam element 20. Spring 44 causes cam element 20 and stud 30 to elevate to the maximum allowable (determined by any horizontal surface above stud 30 and/or the length of spring 44 when unstressed). Rotation of cam element 20 in the direction of arrow 48 then causes protrusion 40 to engage a groove 42, to secure stud 30 in the desired position, under tension.

So that cam element 20 may be released from engagement with grooves 42 in pin 14, protrusion 40 (FIG. 3) is deliberately formed so as to leave a gap 41 within cam element 20. Gap 41 is sized to allow pin 14 to pass through cam element 20 when protrusion 40 is not in engagement with a groove 42.

It is to be understood that, in any of the embodiments described, parts 24 and 26 of cam element 20 may be attached one to the other in any suitable way, including by pop riveting.

Figure 13:
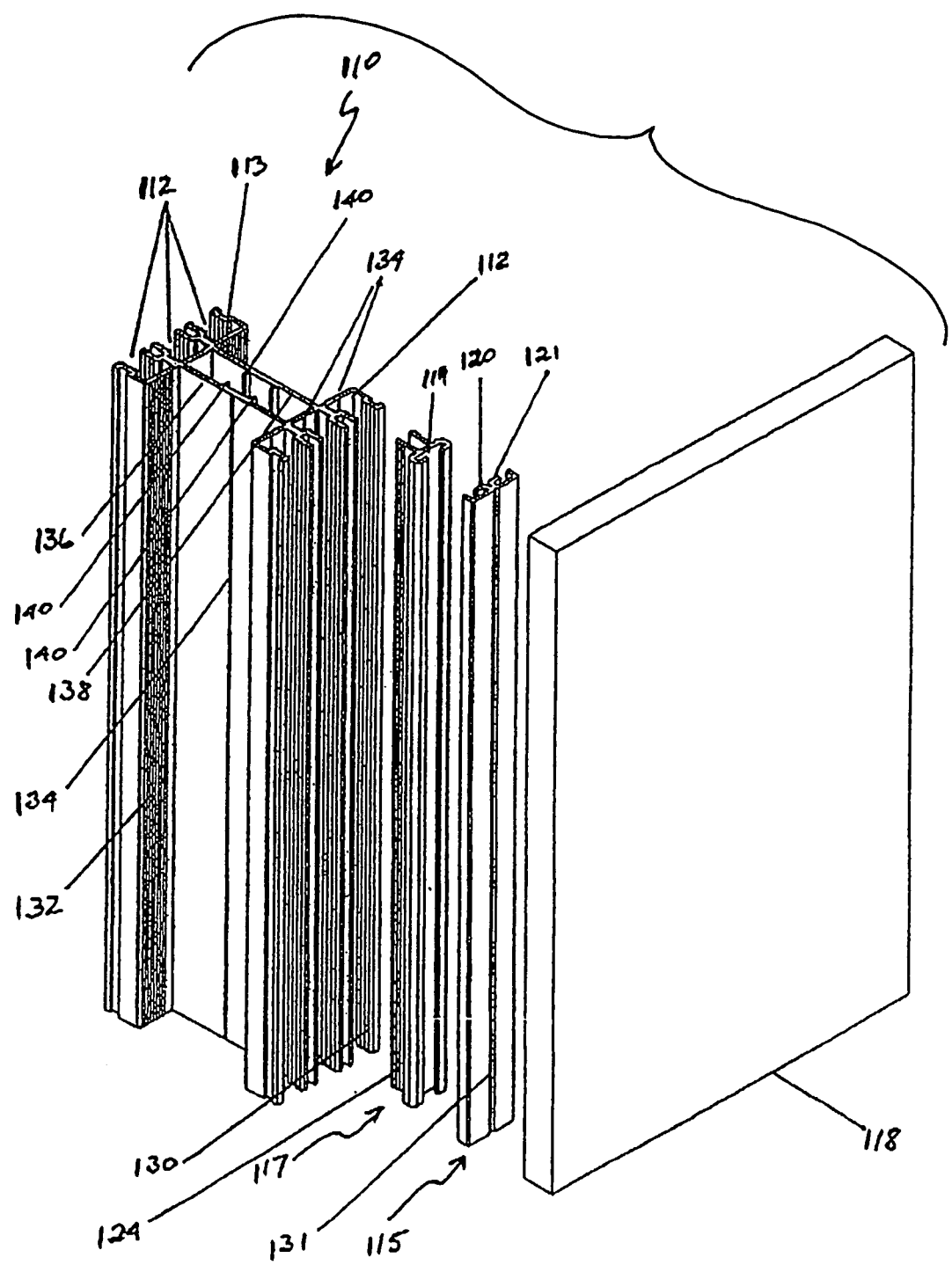
FIG. 13 shows, in perspective view, the stud in FIGS. 1 to 3, without cutouts, and also an embodiment of a joining clip for the stud.
Figure 14:
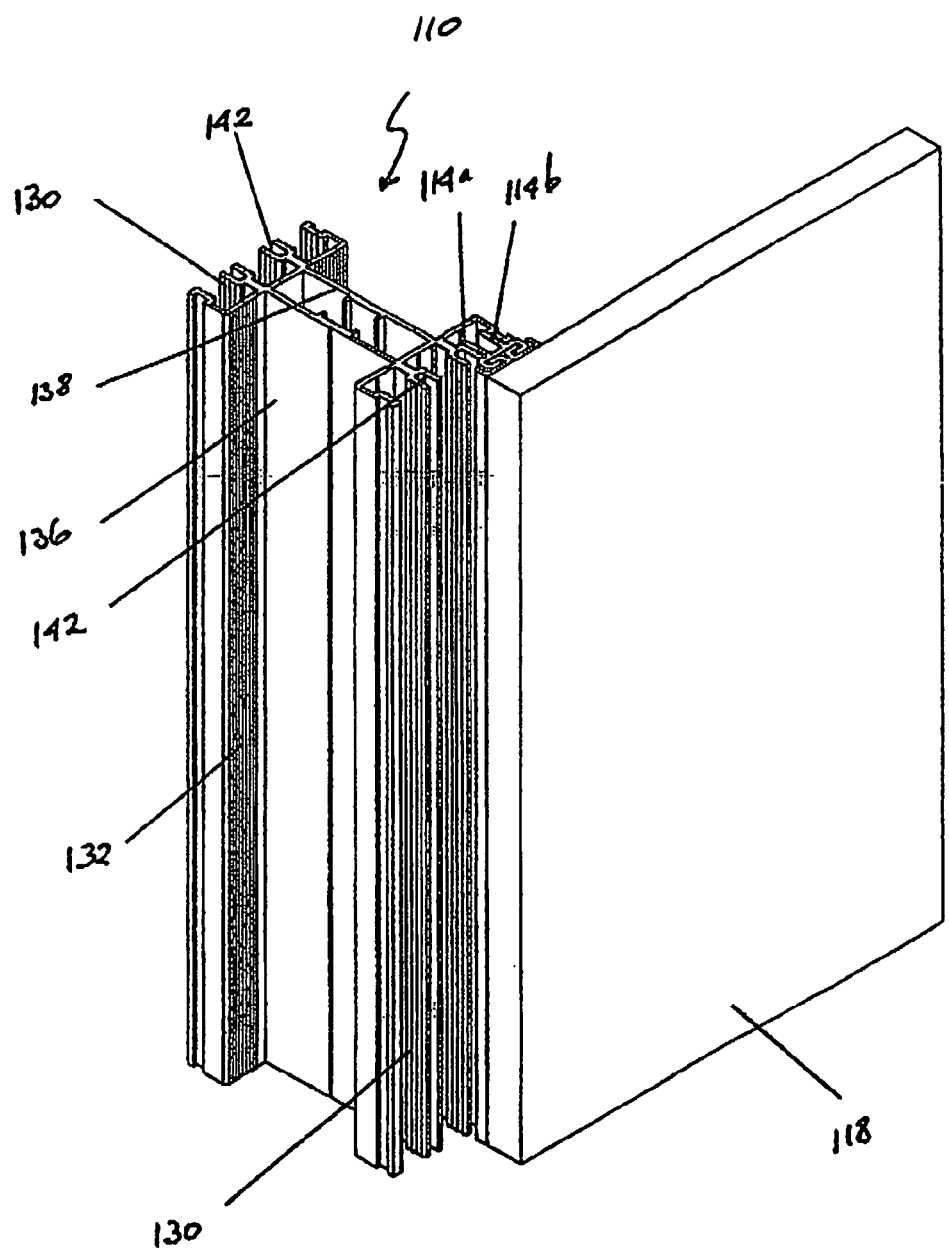
FIG. 14 shows the stud and joining clip of FIG. 13, together with the panel also present in FIG. 13, all joined together.

Referring next to FIGS. 13 and 14, stud 110 has channels 112 arranged in two sets of three. Each channel 112 has a base, 113. Each set of channels 112 is separated from the other by parallel webs 136 and 138 which include reinforcing ribs 140.

Joining clip 116 is made of two parts, clip carrier 115 and clip 117. Clip carrier 115 is adapted to be attached by a screw or nail inserted between parts 120 and 121 through groove 131 into panel 118. Parts 120 and 121 on clip carrier 115 are adapted to push or slide into C-shaped channel 119 on clip 117.

Clip 117 has co-operating means comprising resilient arms 114a and 114b which can be forward fitted into one of channels 112. Arms 114a and 114b carry grooves or serrations 126 which can lock into corresponding grooves 130 in the side walls of channel 112.

Stud 110 includes further grooves 132 to induce mass as well as screw locating grooves 134.

The walls of channels 112 may be bifurcated to include large grooves 142 to assist in reducing mass.

As already indicated, it is contemplated that clip carrier 115 will be attached to panel 118 at the factory, transported to the site and there mated with clip 117 which in turn is then fitted into channel 112 of stud 110.

Turning now to FIG. 15, stud 150 is similar to stud 110 and more clearly illustrates grooves 130, 132 and 142. It will be noted, however, that stud 150 omits reinforcing ribs 140. Otherwise, stud 150 is very similar to stud 110.

Figure 16:
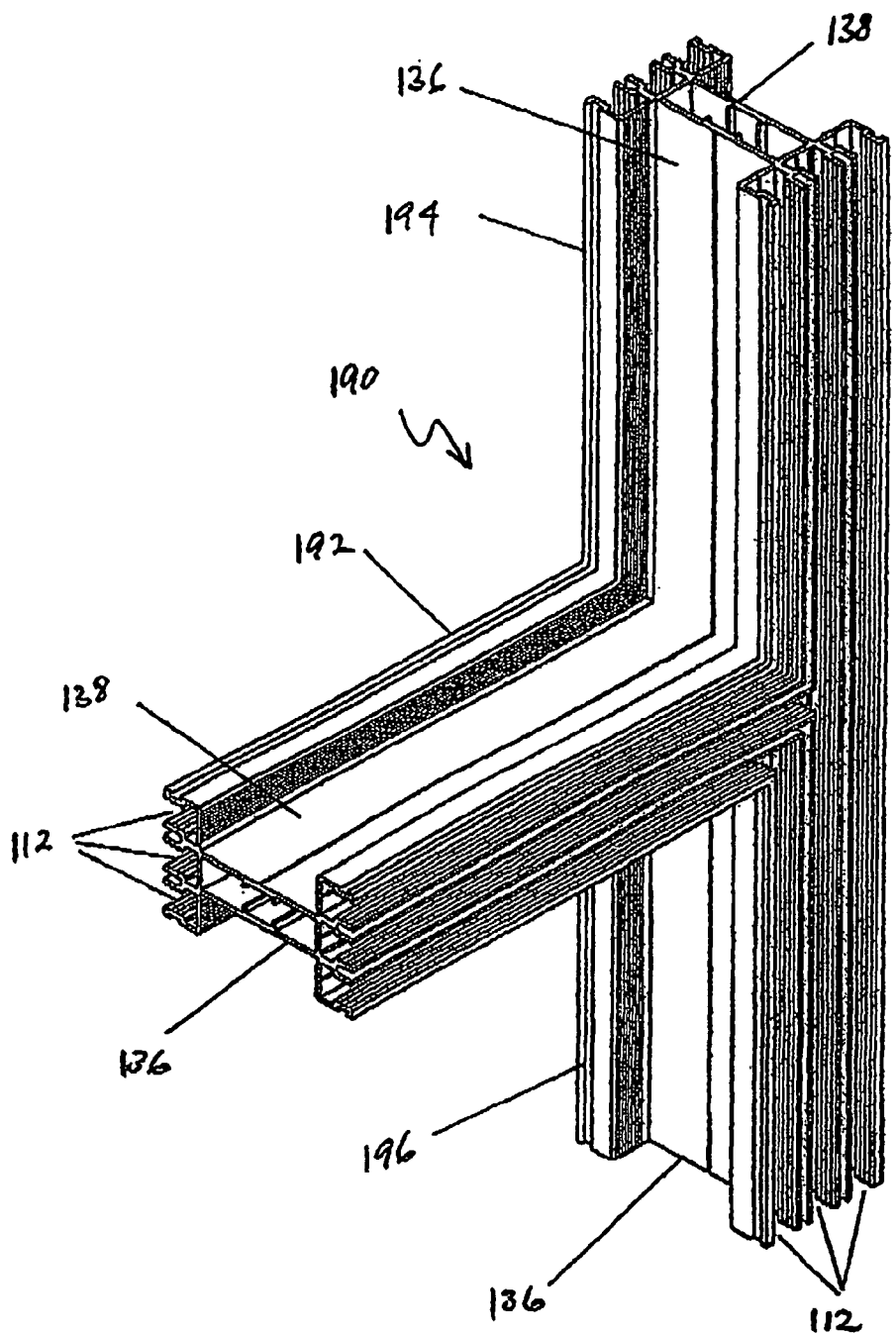
FIG. 16 is a perspective view of a third embodiment the building element of the invention, being a mullion, having two webs and first, second and third arms.
Figure 17:
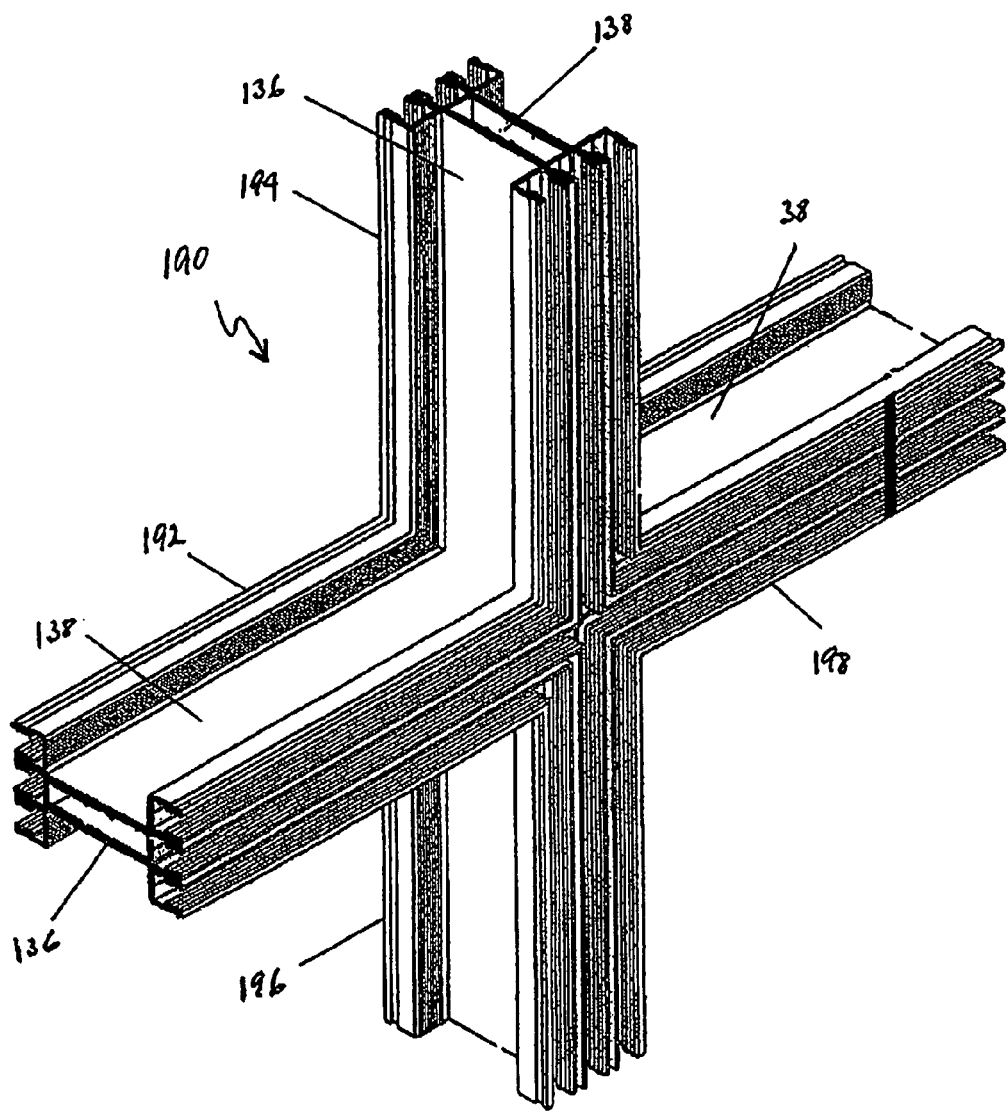
FIG. 17 is a similar embodiment to that of FIG. 16, but having first, second, third and fourth arms.

In FIG. 16 and FIG. 17, it can be seen that each arm of building element 190 is joined to a corresponding arm by webs 136 and 138.

INDUSTRIAL APPLICABILITY

The adjustment device of the invention provides a convenient and efficient means to adjust the height of an element. It has ready application in the building industry, where it can provide adjustment for shortcomings in alignment or manufacture of studs, for example. It can enable the use of studs, for example, with a significant difference in height, in the same location. It can be used to level furniture and appliances, inter alia.

The building element being a stud or mullion permits the use of screws or other penetrating articles without compromising the strength of the stud or mullion.

The building element being the joining clip streamlines integration of the clip with panels, for example, and facilitates the construction of buildings and furniture.

The invention claimed is:

1. A building element suitable for use as a stud or mullion, the building element including a first set of three channels and a second set of three channels, each channel in each set being substantially dimensionally similar, the first set of channels being parallel to and spaced from the second set of channels, each channel in the first set of channels having a base between a pair of parallel sides, which sides are also parallel to the sides of the other channels in the first set, the bases of the channels in the first set of channels being aligned, characterized in that the first set of channels is spaced from the second set of channels by first and second webs, the first web being parallel to and spaced from the second web, each sides of the channel having serrations for receiving a cooperating means for the purpose of mounting a panel or bracket on the building element, and wherein the building element is a unitary structure.

2. The building element of claim 1, in which the building element has a first arm and a second arm, the first arm being at an angle to the second, each arm including the first set of channels, the second set of channels and the first and second webs.

3. The building element of claim 2, wherein the angle between the first and second arms is 90°.

4. The building element of claim 2, which has more than two arms.

5. The building element of claim 4, where there are three arms and the building element forms a T shape.

6. The building element of claim 4, wherein there are four arms and the building element forms a cruciform shape.

7. The building element of claim 4, wherein the arms lie in more than one plane.

8. A building assembly comprising:

a building element suitable for use as a stud or mullion, the building element including a first set of three channels and a second set of three channels, each channel in each set being substantially dimensionally similar and adapted to receive a co-operating means for the purpose of mounting a panel or bracket on the building element, the first set of channels being parallel to and spaced from the second set of channels, each channel in the first set of channels having a base between a pair of parallel sides, which sides are also parallel to the sides of the other channels in the first set, the bases of the channels in the first set of channels being aligned, characterized in that the first set of channels is spaced from the second set of channels by first and second webs, the first web being parallel to and spaced from the second web, and wherein the building element is a unitary structure; and a joining clip adapted to mount a panel or bracket to the building element, the joining clip including a co-operating means for the purpose of mounting the panel or bracket to the building element and also including means for connecting the joining clip to the panel or bracket, the co-operating means including a pair of resilient arms, characterized in that the joining clip has two separate parts: a first longitudinally extending part which includes the means for connecting the joining clip to the panel or bracket and a second longitudinally extending part which includes the pair of resilient arms, the first part being adapted to mate with the second part.

9. The building assembly of claim 8, wherein the first part of the joining clip has a protrusion adapted to snap into or slide into a channel on the second part of the joining clip.

10. The building assembly of claim 8, wherein the first and second parts of the joining clip are made of relatively resilient material, to assist in mating one with the other.

11. The building assembly of claim 8, wherein the joining clip also functions as an internal drain or a seal.

12. The building assembly of claim 8, wherein the joining clip is made of stainless steel.

13. The building assembly of claim 8, wherein the resilient arms included in the co-operating means of the joining clip contain grooves adapted to complement grooves in walls of the channels of the building element.

* * * * *